(12) United States Patent
Webb et al.

(10) Patent No.: US 7,550,126 B2
(45) Date of Patent: Jun. 23, 2009

(54) $NO_x$ AUGMENTATION IN EXHAUST GAS SIMULATION SYSTEM

(75) Inventors: Cynthia C. Webb, San Antonio, TX (US); Christopher A. Sharp, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 154 days.

(21) Appl. No.: 11/627,122

(22) Filed: Jan. 25, 2007

(65) Prior Publication Data

US 2008/0178574 A1 Jul. 31, 2008

(51) Int. Cl.
*C01B 21/20* (2006.01)
*G05D 7/00* (2006.01)

(52) U.S. Cl. .................. 423/385; 423/400; 423/402; 423/403; 423/405; 422/105; 422/107; 73/23.31; 73/114.01; 73/118.02

(58) Field of Classification Search .......... 423/385, 423/400, 402, 403, 405; 422/105, 107; 73/23.31, 73/114.01, 118.02
See application file for complete search history.

(56) References Cited

U.S. PATENT DOCUMENTS

| | | | | |
|---|---|---|---|---|
| 3,110,563 A | * | 11/1963 | Heinrich et al. | ............. 423/403 |
| 3,136,602 A | * | 6/1964 | Berger | ......................... 423/403 |
| 4,367,204 A | * | 1/1983 | Klopp et al. | ............. 423/239.2 |
| 4,957,720 A | * | 9/1990 | Wiegand et al. | ............. 423/392 |
| 6,183,246 B1 | | 2/2001 | Le Gouefflec | ............... 432/128 |
| 6,534,029 B1 | * | 3/2003 | Klein et al. | ................. 423/392 |
| 6,602,820 B1 | | 8/2003 | Göbel et al. | ................ 502/304 |
| 6,619,107 B1 | | 9/2003 | Tsukamoto et al. | ........ 73/118.1 |
| 6,649,134 B2 | * | 11/2003 | Gorywoda et al. | ........ 423/239.1 |
| 6,703,343 B2 | | 3/2004 | Park | ........................... 502/355 |
| 6,828,156 B2 | | 12/2004 | Ohsuga et al. | ............. 436/135 |
| 6,886,396 B2 | | 5/2005 | Tsukamoto et al. | ........ 73/118.1 |
| 6,912,847 B2 | | 7/2005 | Deeba | ......................... 60/297 |
| 2006/0019824 A1 | | 1/2006 | Miyoshi et al. | ............. 502/304 |

FOREIGN PATENT DOCUMENTS

| | | |
|---|---|---|
| EP | 0 009 523 A1 | 4/1980 |
| JP | 10 311212 A | 11/1998 |
| JP | 2000 262862 A | 9/2000 |
| JP | 2004 108185 A | 4/2004 |
| WO | 92/16455 A1 | 10/1992 |

OTHER PUBLICATIONS

International Search Report and Written Opinion PCT/US2008/051115, 12 pages, Jun. 24, 2008.

* cited by examiner

*Primary Examiner*—Timothy C Vanoy
(74) *Attorney, Agent, or Firm*—Baker Botts L.L.P.

(57) ABSTRACT

Various methods and systems for augmenting the amount of $NO_X$ in the exhaust of an exhaust flow simulation system. These methods and system can be "combustion" or "post combustion". A combustion embodiment injects a nitrogen-containing compound (doping agent) into the burner, so that it mixed and combusted with the fuel.

17 Claims, 5 Drawing Sheets

NO$_x$ AUGMENTATION IN EXHAUST GAS SIMULATION SYSTEM

TECHNICAL FIELD OF THE INVENTION

The present application relates in general to systems for simulating the exhaust flow of an engine, for use in testing devices affected by the exhaust.

BACKGROUND OF THE INVENTION

As a result of stricter regulations for automotive emissions, it was desired to design a testing apparatus and procedure for testing emissions control devices. Historically, actual internal combustion engines have been used for such evaluations. However, the use of a real engine for long term testing can be inconsistent, maintenance intensive, and expensive to operate. In addition, a real engine does not conveniently permit the separate evaluation of individual variables, such as the effects of various constituents of fuel and oil.

U.S. Patent Pub. No. 2003/0079520, entitled "Method and Apparatus for Testing Catalytic Converter Durability" and U.S. Patent Pub. No 2004/0007056 A1, entitled Method for Testing Catalytic Converter Durability", both describe an exhaust flow simulation system. The system comprises a fuel-combustive burner with an integrated, computerized control system. The system realistically simulates the flow of exhaust gas from an engine under a variety of load conditions.

For testing emissions control devices designed for diesel engines, a burner system can provide an effective and practical approach to perform aging and evaluation work. It provides accurate control of the air-to-fuel ratio (AFR) and exhaust temperature. In addition, it can more easily achieve elevated temperatures and a wider band of AFR control than can be achieved with engine-based systems. U.S. patent application Ser. No. 10/917,230, to Anderson, et al, entitled Testing Using Diesel Exhaust Produced by Non Engine Based Test System, now U.S. Pat. No. 7,212,926, and assigned to Southwest Research Institute, described a burner-based exhaust gas simulation system used to simulate exhaust from a diesel engine.

DETAILED DESCRIPTION OF THE INVENTION

The following description is directed to a burner-based exhaust flow simulation system, which produces a flow of exhaust gas with a composition and temperature corresponding to the exhaust flow produced by a diesel-type internal combustion engine. The system can be used with or without introducing oil to simulate engine oil consumption.

As an example of one application of the system, an emissions control device can be installed on the exhaust line downstream of the burner. The effect of extended driving conditions and elevated temperatures on the emissions control device can be simulated. The system can also simulate the effects of additives and contaminants from the engine. The system is capable of "aging" the emissions control device, which can then be evaluated, and if desired, performance tested on an actual vehicle.

Other applications of the exhaust flow simulation system are possible. Various sensors, such as those used for emissions monitoring and control, can be tested. Materials used to fabricate any component affected by exhaust gas can be tested. The subject of the testing may be a fuel, an additive, or an oil. Or, various environmental factors may be introduced and their effect evaluated.

U.S. Patent Pub. No. 2003/0079520 and U.S. Patent Pub. No 2004/0007056, referenced in the Background and incorporated by reference herein, each describes an exhaust flow simulation system with which the invention described herein may be used. For purposes of example, the invention is described as an improvement to those systems. However, the invention is not limited to those particular systems, and in general, can be used with any burner-based exhaust flow simulation system.

For producing diesel exhaust, one challenge is to provide amounts of oxides of nitrogen (NO$_x$) in the exhaust that are comparable to the exhaust of a real diesel engine. This is primarily because a burner system combusts continuously and at near atmospheric pressure, which produces lower peak combustion temperatures than does a diesel engine. As used herein, the terms "NO$_x$ containing exhaust" and "diesel exhaust" are used equivalently and refer to the exhaust of any engine whose exhaust contains NO$_x$ in any amount desired to be simulated and tested by system 100. Such engines are typically diesel engines, but could be engines that burn other types of fuels.

Figure 1:
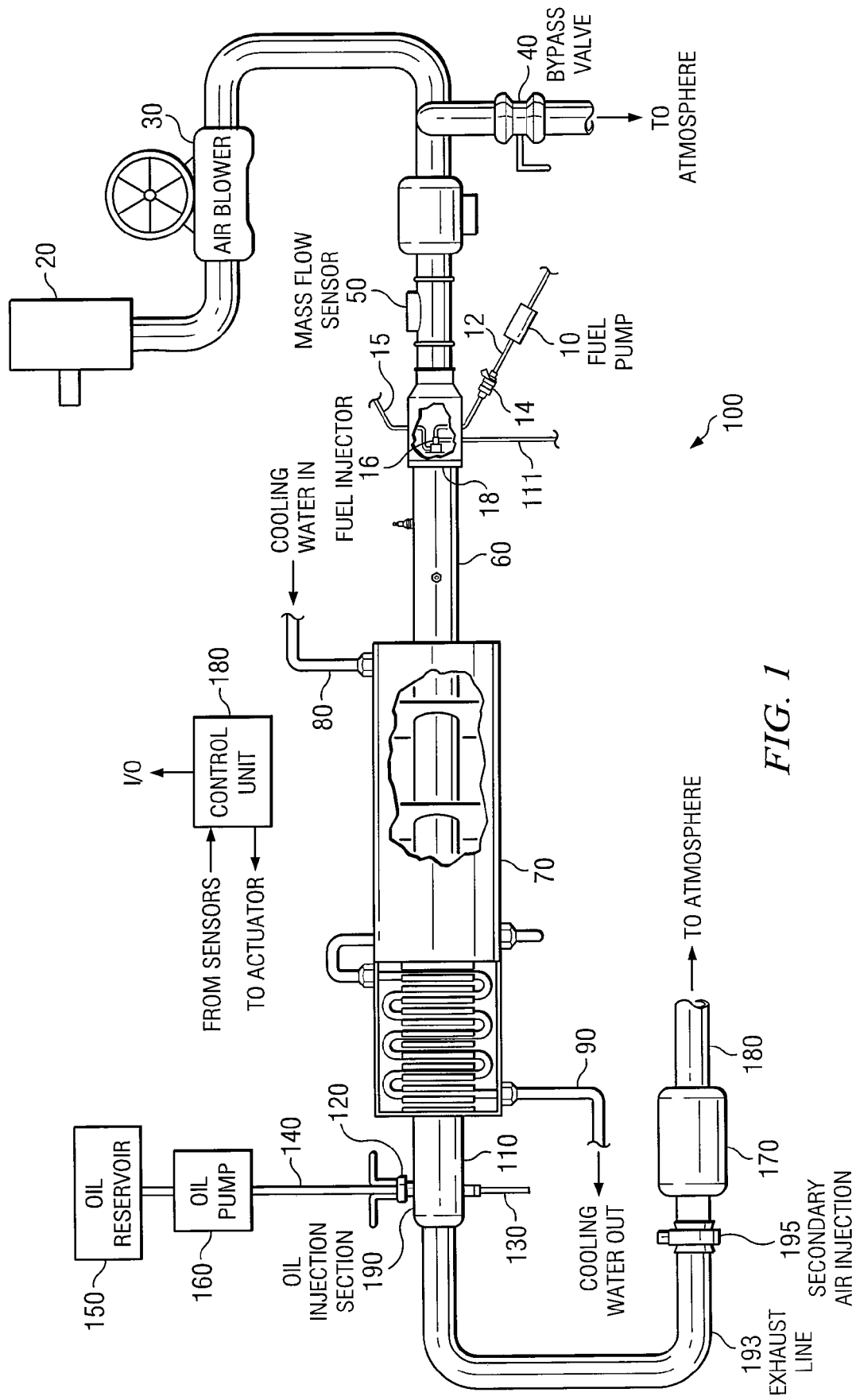
FIG. 1 illustrates an exhaust gas simulation system having injection of a nitrogen containing compound into the burner in accordance with one aspect of the invention.

FIG. 1 illustrates a burner-based exhaust flow simulation system 100 for providing NO$_x$-containing exhaust in accordance with the invention. In the example of this description, an emissions control device 170 is installed for testing. However, as explained above, system 100 has numerous applications, not all of which require installation of such a device.

System 100 has seven subsystems: (1) an air supply system to provide air for combustion to the burner, (2) a fuel system to provide fuel to the burner, (3) a burner system to combust the air-fuel mixture and provide the proper exhaust gas constituents, (4) a heat exchanger to control the exhaust gas temperature, (5) an oil injection system, (6) a secondary air injection system, and (7) a computerized control system.

The following description discusses various approaches to augmenting the amount of NO$_x$ in the exhaust generated by system 100. These approaches may be "combustion" (FIGS. 1, 2, 3A, and 4) or "post-combustion" (FIG. 5). The former involves various methods of injecting a doping agent into the burner so that it is combusted with the fuel to form NO$_x$. The latter involves delivering supplemental NO$_x$ into the exhaust line downstream the burner.

Combustion Air Supply System

An air blower 30 draws ambient air through an inlet air filter 20 and exhausts a pressurized stream of air. A mass air flow sensor 50 monitors air flow. The volume of air supplied is set by adjusting bypass valve 40 to produce a desired flow rate of air.

The air blower 30, filter 20, and the mass air flow sensor 50 may be of any conventional design. An example of a suitable air blower 30 is an electric centrifugal blower. Control unit 180 may be used to actuate and/or receive data from the various elements of the air supply system.

As discussed below, supplying a nitrogen containing compound into the air supply is one, but not the only, approach to augmenting the amount of $NO_X$ in the exhaust produced by system 100.

Fuel Supply System

A fuel pump 10 pumps engine fuel through a fuel line 12 to a fuel control valve 14. An example of a suitable fuel control valve 14 is a solenoid valve that receives a pulse-width modulated signal from control unit 180, and regulates the flow of fuel to the burner 60 in proportion to the pulse width. Via the fuel line 12, fuel is delivered to a fuel spray nozzle 16 in the burner 60.

As explained below, one aspect of the invention is injection of a nitrogen-containing compound (doping agent) into the burner, such that the compound is combusted with the fuel.

Fuel injector 16 has a doping line 111 with an aperture into the fuel injection nozzle, for adding a nitrogen-containing doping agent to the fuel. The doping agent is mixed with the fuel at the nozzle, so that the doped fuel mixture enters the burner flame. Doping line 111 may be pressurized and/or air-assisted to provide atomization and to prevent fouling from back flow when not in use. The input rate of the doping agent is variable, to control the overall $NO_X$ level in the exhaust. This aspect of the invention is further discussed below, and in particular, in connection with FIG. 3A.

Burner

Burner 60 is designed to produce a desired combustion of the fuel and air. In the example of this description, burner 60 is a swirl-stabilized burner capable of producing continuous combustion at rich, lean, or stoichiometric air-fuel ratios.

Figure 2:
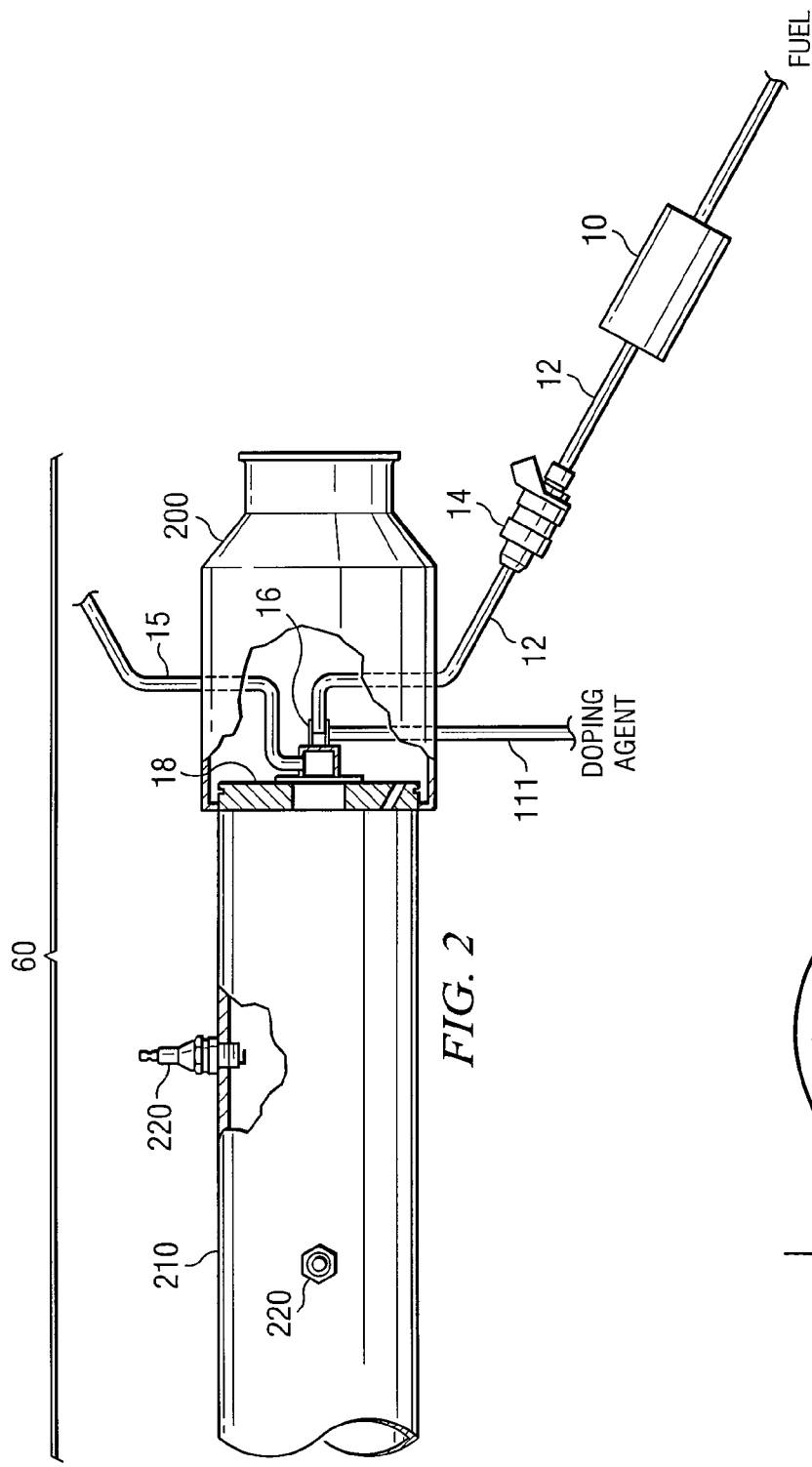
FIG. 2 illustrates the burner of the system of FIG. 1 in further detail.

FIG. 2 illustrates burner 60 in further detail. Burner 60 has both a plenum chamber 200 and a combustion tube 210, separated by swirl plate 18. The combustion tube 210 is constructed of material capable of withstanding extremely high temperatures. Preferred materials include, but are not necessarily limited to INCONEL or stainless steel, and optionally can have a quartz window for visual observation of the resulting flame pattern.

Air and fuel are separately introduced into the burner 60. Air from mass flow sensor 50 is ducted to the plenum chamber 200, then through the swirl plate 18 into the burner tube 210.

The swirl plate 18 is equipped with a fuel injector 16, implemented as an air-assisted fuel spray nozzle 16 at the center of the swirl plate 18. The swirl plate 18 has a central bore, and spray nozzle 16 is fitted to the swirl plate 18 at this central bore using suitable attachment means.

Fuel from the fuel supply line 12 (and a doping agent via line 111) are delivered to the spray nozzle 16, where the doped fuel is mixed with compressed air from air-assist line 15. The mixture is sprayed into the combustion tube 210. The compressed air line 15 provides high pressure air to assist in fuel atomization.

Swirl plate 18 is capable of producing highly turbulent swirling combustion, so as to provide a complex pattern of collapsed conical and swirl flow in the combustion area. The flow pattern created by the swirl plate 18 involves the interaction of a number of jets bored through swirl plate 18. The arrangement and angling of these jets dictate how they direct air. For example, "turbulent jets" may be used to direct the air toward the central bore. Other jets may be used to direct air from the outer circumference of the swirl plate 18. The precise dimensions and angular orientation of the jets may vary. The jets may further be used to prevent the flame from contacting the fuel spray nozzle 16.

Combustion tube 210 is equipped with one or more spark igniters 220. In a preferred embodiment, three substantially equally spaced spark igniters 220 are located around the circumference of the combustion tube in the gas "swirl path" created by the swirl plate 18. An example of a suitable igniter is a marine spark plug.

Swirl plate 18 may be implemented as a substantially circular disc having a thickness sufficient to fix the air flow pattern and to create an "air shroud" that is effective to protect the fuel injector 16. The swirl plate 18 is made of substantially any material capable of withstanding high temperature, a preferred material being stainless steel.

In some embodiments, suitable for combustion of low volatility fuels, combustion tube 210 is further equipped with ceramic foam located downstream from the spray nozzle 16. Substantially any suitable foam may be used, such as SiC ceramic foam.

Heat Exchanger

Referring again to FIG. 1, the exhaust from the burner 60 is routed to a heat exchanger 70. The heat exchanger 70 may be of any conventional design known to a person of ordinary skill in the art. In the example of this description, the heat exchanger 70 consists of two sections. An upstream section consists of a water jacketed tube. A downstream section is a vertical cross flow shell and tube heat exchanger. The vertical cross flow design minimizes steam formation and steam trapping within the cooling tubes.

Heat exchanger 70 is provided with an inlet water line 80 and an outlet water line 90 which supply and drain cooling water. The heat exchanger 70 cools the exhaust gas to reach (or assist in reaching) a desired exhaust gas temperature at the inlet to emissions control device 170.

Oil Injection System

Downstream from the burner 60, the exhaust gas is routed past an optional oil injection section 110, which may be used to introduce a precisely controlled amount of lubricating oil into the exhaust stream. In the example of this description, the oil injection system 110 is installed in a four inch diameter pipe, and placed in a location where the exhaust gas temperature is approximately 600 degrees C.

The oil injection section 110 provides an atomized oil spray comprising oil droplets with a sufficiently small diameter to vaporize and oxidize the oil before it reaches the emissions control device 170. The oil injection system 110 may include means for metering the consumption rate and oxidation state (unburned, partially burned, or fully burned) of the oil delivered downstream the oil injection.

In the example of FIG. 1, motor oil is withdrawn from an oil reservoir 150 by means of an oil pump 160. Substantially any type of pump may be used, preferably a peristaltic pump which feeds the oil from the reservoir through an oil injection line 140 and into a water cooled probe 120 from which the oil is injected into the exhaust gas.

Secondary Air Injection

Secondary air injector 195 is placed upstream of the emissions control device 170, and supplies air into the exhaust flow line 193. Although, this description is in terms of supplying air, injector 195 may be equivalently used to supply any other type of gas or gas mixture into the exhaust flow.

Downstream of secondary air injector 195, the exhaust gas, now mixed with the injected oil and secondary air, passes through emissions control device 170, following which the exhaust gas is vented to the atmosphere.

Control Unit

Referring again to FIG. 1, control unit 180 receives input from various sensors associated with system 100 and delivers control signals to its various actuators. Control unit 180 may be implemented with conventional computing equipment, including processors and memory. It is equipped with suitable input devices, a monitor, and a multi-function data acquisition card, connected to a digital relay module to monitor and record system information, and to control system electronics. Control unit 180 is programmed to run various simulation programs.

The sensors include sensor 50 and may further include sensors for measuring various gas contents and flows. Various measured parameters collected by control unit 180 may include: the mass air flow in the system, the air/fuel ratio (linear and EGO), the exhaust gas temperature at the outlet from the heat exchanger, the exhaust gas temperature at the inlet to the emissions control device, and the exhaust gas temperature at the outlet from the emissions control device, and various chemical constitutants of the exhaust. The information measured by the sensors is transmitted by electronic signals to control unit 180, which measures all of the monitored parameters on a periodic basis and stores the measurement data in memory.

The actuators controlled by control unit 180 include the various injectors, pumps, valves, and blowers described above. More specifically, control unit 180 controls the air-to-fuel ratio by modulating the fuel delivered to the fuel injector 16 under either an open loop or closed loop control configuration. Control unit 180 further provides a means to control ignition, air assist to the fuel injector, auxiliary air, fuel feed, blower air feed, and oil injection. An example of a suitable control system would be a proportional integral derivative (PID) control loop.

Control unit 180 monitors system 100 for safety. For example, it may be used to verify that the burner is lighted and that the exhaust is within specified limits for both temperature and air to fuel ratio. The control unit 180 is programmed to identify and address failure modes, and to monitor and control system 100 to a safe shutdown if a failure mode is detected.

Interactive interface programming of control unit 180 permits an operator to develop and run various aging cycles. The operator can use control unit 180 to investigate the effects of exposure to various oils and other fuel contaminants or additives. The inlet temperature to the emissions control device 170 can be adjusted over a wide range of temperatures.

Control unit 180 may be used to switch power to the blowers and fuel pump, as well as control the air assisted fuel injectors, burner spark, oil injection, and auxiliary air. System temperatures, mass air flow for the burner air, and the burner air to fuel ratio are measured and converted to engineering units. The software program uses measured data to calculate total exhaust flow and burner air to fuel ratio, and to check conditions indicative of a system malfunction. The burner air to fuel ratio may be controlled as either open or closed loop, maintaining either specified fuel flow or specified air to fuel ratio. Air to fuel ratio control is achieved by varying the rate of fuel delivered to the burner. Whenever necessary, open loop control can be activated allowing the operator to enter a fixed fuel injector pulse duty cycle. Closed loop control can be activated in which the actual burner air to fuel ratio is measured and compared to the measured value of the air to fuel setpoint and then adjusting the fuel injector duty cycle to correct for the measured error.

Augmentation of $NO_X$

For both system 100 and a real diesel engine, the primary pathway for $NO_X$ production is thermal $NO_X$ formation. The equilibrium $NO_X$ concentration formed through the thermal mechanism is predominantly controlled by the concentration of nitrogen-containing reactants, the combustion temperature, residence time in a "hot zone", and the oxygen concentration of the combusted mixture.

Figure 3:
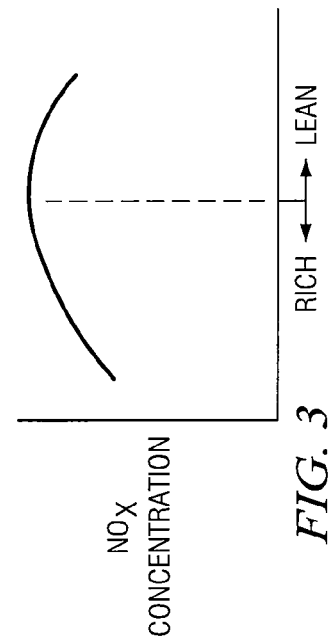
FIG. 3 illustrates the relationship between the stoichiometry of the burner and NO$_x$ concentrations in the exhaust.

FIG. 3 illustrates how $NO_X$ concentration is reduced as the AFR deviates from stiochiometric (a molar balance of air to fuel ideal for complete combustion). For burner 60, the temperature peaks slightly rich of stiochiometric. At this point, oxygen is minimum. As the chemical balance moves toward a lean AFR, there is more available oxygen and the dilution of the flame with excess oxygen that is not participating in combustion reduces the flame temperature. Combustion temperature is also affected by the pressure of combustion, such that lower pressures lead to lower peak combustion temperatures. Reduction in flame temperature dominates the rate forming equations for $NO_X$. Because system 100 is a constant pressure atmospheric pressure combustion system (compared to the high pressure combustion of diesel engines), using system 100 to obtain representative $NO_X$ concentrations can be difficult.

One approach to enhancing $NO_X$ formation is to enhance pre-combustion nitrogen-containing sources. In a typical combustion system, there are several primary sources of nitrogen for $NO_X$ formation, including atmospheric nitrogen and nitrogen-containing components in the fuel. To break down atmospheric nitrogen, high energy input in the form of temperature and pressure is required, and thus reliance on this source is impractical. Nitrogen-containing components in existing fuels include miscible nitrate-bearing compounds such as 2-ethyl hexyl nitrate.

One feature of the invention is the addition of a nitrogen-containing compound, e.g. "a doping agent", into the burner, so that the "normal" fuel and the doping agent are both burned. Examples of "doping agents" as that term is used herein are urea, ammonia (NH3), 2-ethyl hexyl nitrate, or nitrogen containing fuels such as nitromethane.

Figure 3A:
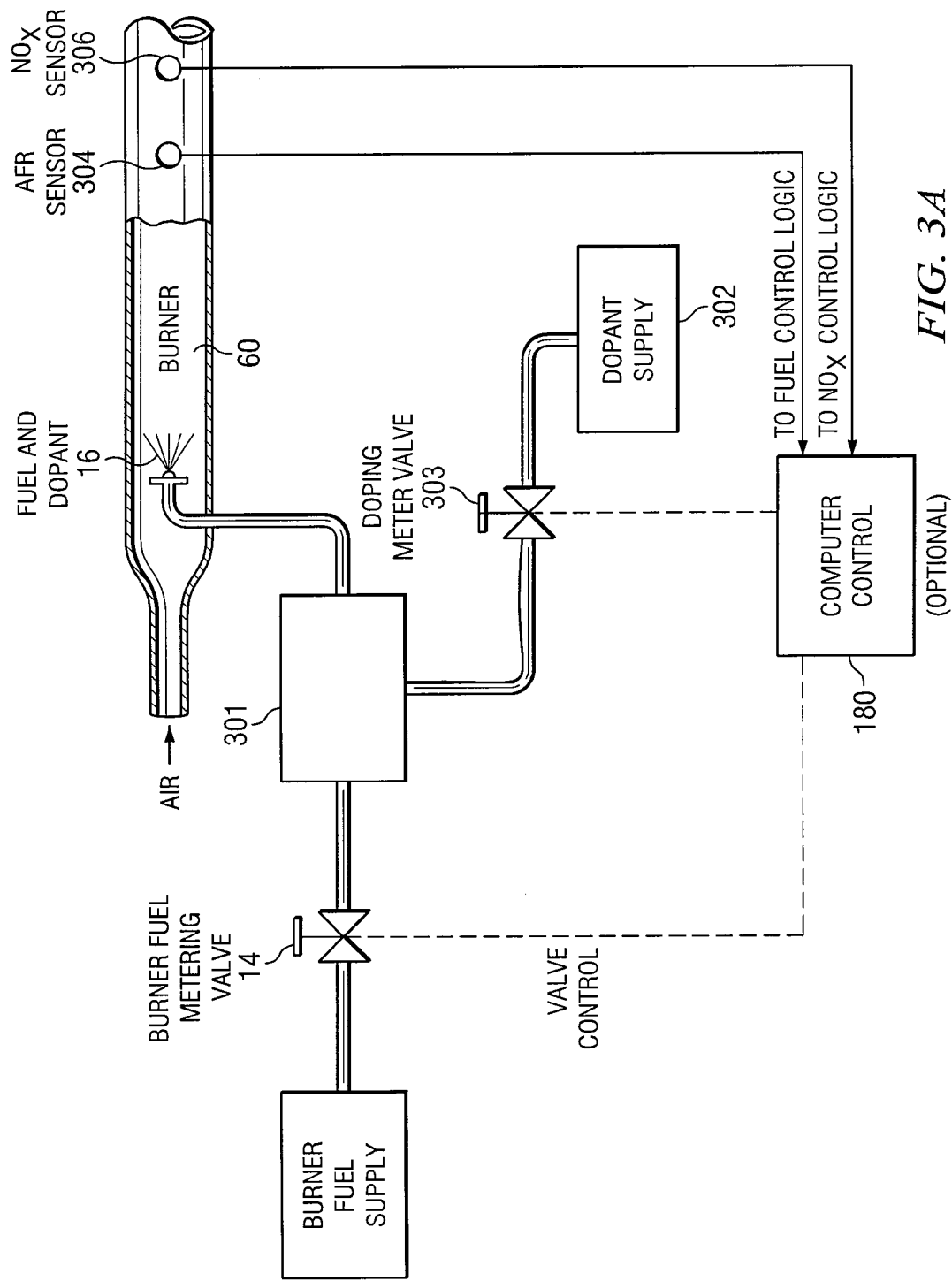
FIG. 3A schematically illustrates the controlled injection of a nitrogen containing doping compound into the fuel source for the burner.

FIG. 3A illustrates the injection of a doping agent into burner 60 schematically. In contrast to the example of FIGS. 1 and 2, the doping agent and the fuel are mixed at a mixing block 301 before the mixture reaches the burner nozzle 16. However, the other features of these embodiments are similar.

The doping agent is stored in a liquid or gas form in a reservoir 302. A metering valve 303 controls the amount of dopant delivered to the burner 60 at any given time. Control of the amount of doping agent can be under computer control, such as by using a special controller or with control programming integrated into the control unit 180. An AFR sensor 304 and a $NO_X$ sensor 305 downstream the burner 60 deliver AFR and $NO_X$ signals to the control unit 180, which uses these signals to determine values used to determine the amount of doping agent and fuel, and to deliver appropriate control signals to the metering valves 14 and 303.

In the embodiments of FIGS. 1 and 3A, the doping agent is mixed with the fuel at the nozzle, so that the doped fuel mixture enters the burner flame. Doping line 111 may be air-assisted to provide atomization and to prevent fouling from back flow when not in use. An example of a suitable doping agent is ammonia (NH3). The input rate of the doping agent is variable, to control the overall $NO_X$ level in the exhaust. Although not specifically shown in FIG. 3A, a pump or other means can be used to pressurize the doping agent supply line.

At elevated temperatures, ammonia participates in thermal $NO_X$ formation. The following equations govern the decomposition of ammonia in the presence of $O_2$:

$$NH_O + \begin{bmatrix} O \\ H \\ OH \end{bmatrix} = NH_{i-1} + \begin{bmatrix} OH \\ H_2 \\ H_2O \end{bmatrix}$$

NH+O>HNO+H

N+O_2>HNO+O $NH_2$+O>HNO+H $NH_2$+$O_2$>HNO+OH

HNO+M>NO+H+M

HNO+H>NO+$H_2$

HNO+OH>NO+$H_2O$

HNO+O>NO+OH

Figure 4:
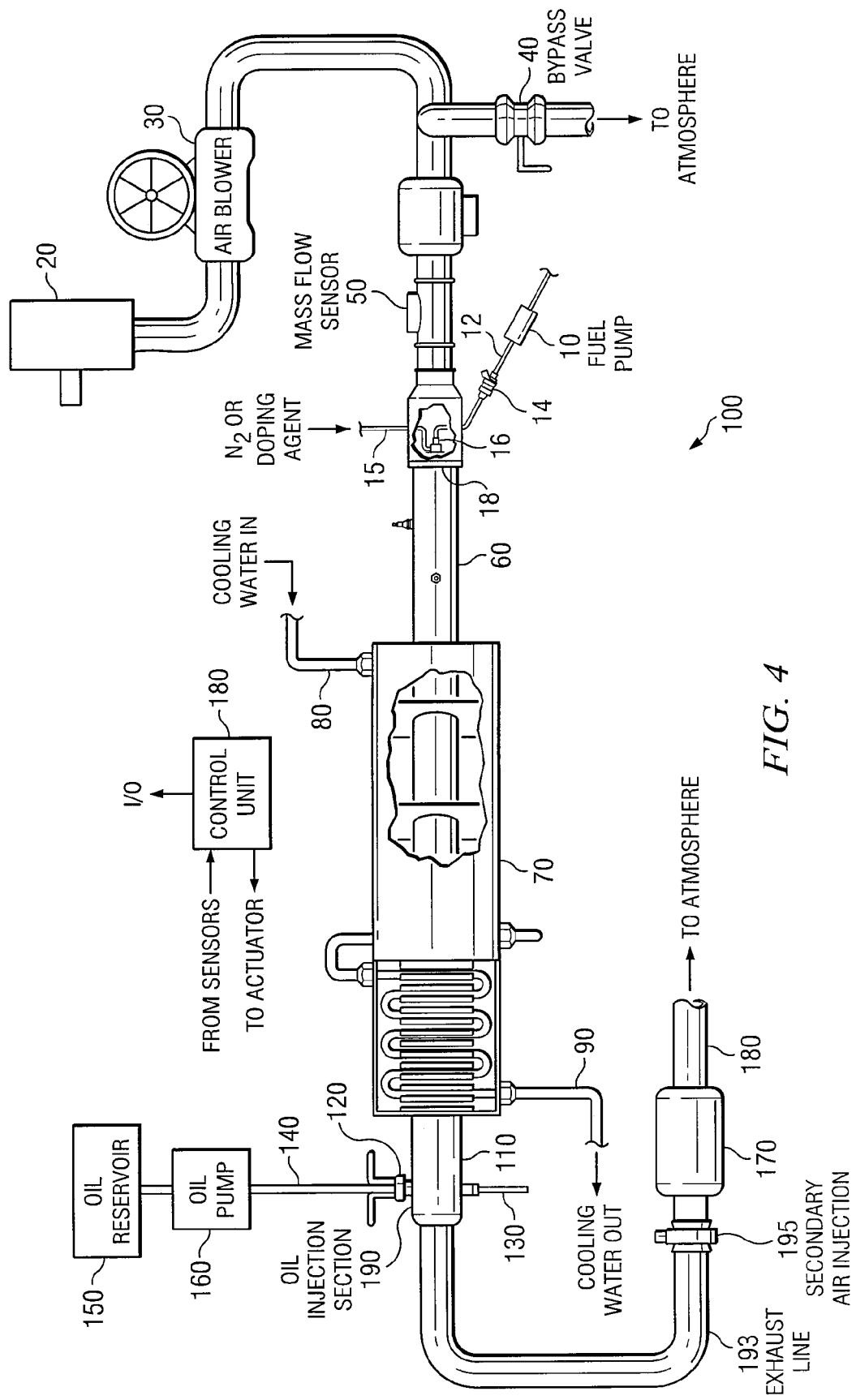
FIG. 4 illustrates the use of a nitrogen containing gas in the air assist of the fuel injector in accordance with a second aspect of the invention.
Figure 5:
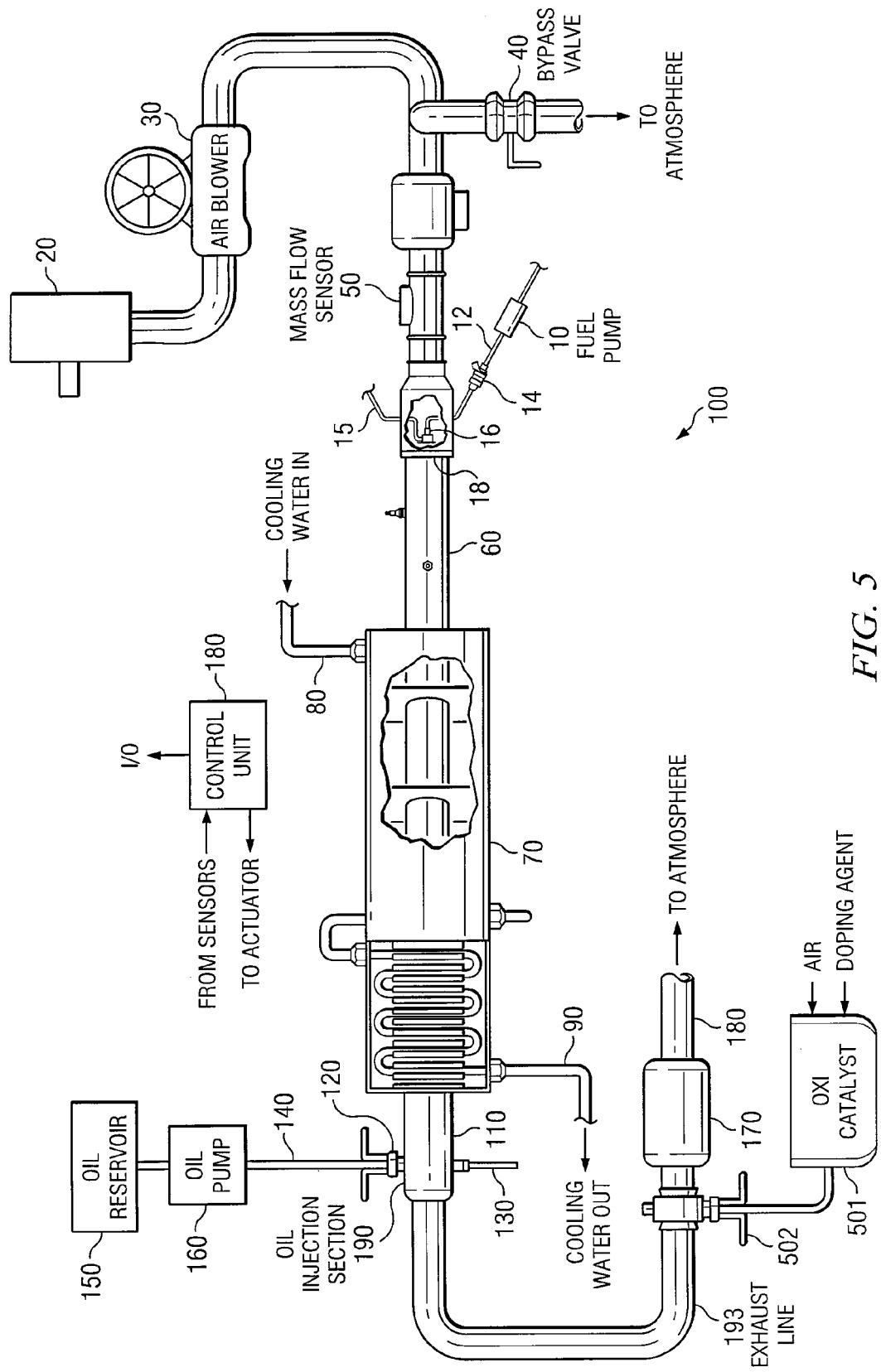
FIG. 5 illustrates the delivering of supplemental NO$_x$ to the exhaust line in accordance with a third aspect of the invention.

FIG. 4 illustrates a second embodiment of the invention. Like the embodiments of FIGS. 1 and 3A, a nitrogen-containing compound is mixed with fuel prior to reaching the flame of burner 60. However, in the embodiment of FIG. 4, the doping agent is introduced in gaseous form via the air assist line 15. Like the embodiment of FIG. 3A, a valve and a control system may be used to control the amount of doping agent delivered into the air assist line. An example of a suitable doping agent is ammonia gas. In the embodiment of FIG. 4, the doping agent could be nitrogen itself.

FIG. 5 illustrates a third embodiment of the invention. Supplemental $NO_X$ is introduced into the exhaust line downstream burner 60. The supplemental $NO_X$ is produced by reacting NH3 in an oxidation catalyst 501 at an elevated temperature. A typical temperature at catalyst 501 is 300 degrees Centigrade. For example, a nitrogen-containing compound is delivered to catalyst 501, together with air at a temperature of 300 degrees. The air and $NO_X$ out of catalyst 51 is injected directly into the exhaust flow to increase the level of exhaust $NO_X$. The concentration of $NO_X$ in the exhaust may be controlled by using a control unit (stand alone or integrated into control system 180) which controls the amount of $NO_X$ generated by catalyst 501, such as by varying the air or reactant flow through, or temperature of, catalyst 501. Alternatively, the flow of $NO_X$ could be controlled by using a valve 502.

In sum, any combination of the following methods could be used for augmentation of $NO_X$ in the exhaust generated by system 100: increase of nitrogen compounds in the "normal" fuel; nitrogen augmentation into the combustion air of the air supply system; injection of a doping agent into the burner flame via the nozzle, the fuel supply line, or the air assist line; and direct supplementation of $NO_X$ into the exhaust line.

The invention claimed is:

1. A $NO_X$ augmentation system for use with an exhaust gas simulation system, the exhaust gas simulation system having an exhaust line downstream a combustive burner that burns a fuel, comprising:
   a mixing block for receiving the fuel, for receiving a nitrogen-containing compound (doping agent) via a doping agent supply line, and for delivering a mixture of fuel and doping agent to the burner;
   a doping agent supply line for delivering the doping agent to the mixing block; and
   a metering valve on the doping agent supply line, for controlling the amount of the doping agent delivered to the mixing block.

2. The system of claim 1, further comprising a control unit programmed to control the amount of doping agent delivered to the mixing block.

3. The system of claim 2, further comprising a $NO_X$ sensor downstream the burner for delivering, to the control unit, a signal representing the amount of $NO_X$ in the exhaust.

4. The system of claim 2, further comprising an AFR sensor downstream the burner for delivering to the control unit, a signal representing the AFR of the exhaust.

5. The system of claim 2, wherein the exhaust gas simulation system has a control system and wherein the control unit is integrated into the control system.

6. The method of claim 5, wherein the burner has an air-assisted nozzle and an air-assist line, and wherein the injecting step is performing by delivering the doping agent in gaseous form to the burner via the air-assist line.

7. The method of claim 6, wherein the doping agent is selected from the following group: urea, ammonia hydroxide, 2-ethyl hexyl nitrate, or nitromethane.

8. The system of claim 1, wherein the doping agent is selected from the following group: urea, ammonia hydroxide, 2-ethyl hexyl nitrate, or nitromethane.

9. A method of augmenting the amount of $NO_X$ in a system for simulating exhaust flow from an internal combustion engine, comprising:
   combusting fuel using a burner;
   injecting a nitrogen doping agent into the burner; and
   exhausting the exhaust from the combusting step through an exhaust line.

10. The method of claim 9, wherein the burner has an air-assisted nozzle, and wherein the injecting step is performed by delivering the doping agent to the burner via a doping line connected directly to the nozzle.

11. The method of claim 10, wherein the doping agent is selected from the following group: urea, ammonia hydroxide, 2-ethyl hexyl nitrate, or nitromethane.

12. The method of claim 9, wherein burner receives fuel via a fuel supply line, and wherein the injecting step is performed by mixing the doping agent with the fuel at a point along the fuel supply line.

13. The method of claim 12, wherein the doping agent is selected from the following group: urea, ammonia hydroxide, 2-ethyl hexyl nitrate, or nitromethane.

14. A burner-based system for generating exhaust gas that simulates $NO_X$-containing exhaust gas produced by an internal combustion engine, comprising:
   a burner system having at least a burner for receiving air and fuel and for combusting the fuel to produce simulated engine exhaust;
   an exhaust line for carrying the exhaust from the burner;
   a $NO_X$ augmentation system having:
   a mixing block for delivering a mixture of fuel and a nitrogen-containing compound (doping agent) to the burner; a doping agent supply line for delivering the doping agent to the mixing block; and a metering valve for controlling the amount of the doping agent delivered to the mixing block;
   a computerized control system operable to control the burner to simulate one or more engine cycles, and to control the amount of doping agent delivered to the burner.

15. The method of claim 14, wherein the doping agent is urea, ammonia (NH3), or 2-ethyl hexyl nitrate.

16. A post-combustion $NO_X$ augmentation system for use with an exhaust gas simulation system, the exhaust gas simulation system having an exhaust line downstream a combustive burner, comprising:
- an oxidation catalyst for receiving a supply of a nitrogen-containing compound and oxygen, and for reacting the nitrogen-containing compound and oxygen to produce $NO_X$;
- a $NO_X$ supply line for delivering the $NO_X$ into the exhaust line; and
- a metering valve for controlling the amount of $NO_X$ delivered to the exhaust line.

17. A post-combustion $NO_X$ augmentation system for use with an exhaust gas simulation system, the exhaust gas simulation system having an exhaust line downstream a combustive burner, comprising:
- an oxidation catalyst for receiving a supply of a nitrogen-containing compound and oxygen, and for reacting the nitrogen-containing compound and oxygen to produce $NO_X$;
- a $NO_X$ supply line for delivering the $NO_X$ into the exhaust line; and
- a control unit for controlling the amount of $NO_X$ generated by the oxidation catalyst.

* * * * *